(12) United States Patent
Oh (10) Patent No.: US 10,505,368 B2
(45) Date of Patent: Dec. 10, 2019

(54) DUAL CONTROL APPARATUS AND CONTROL METHOD FOR HVDC SYSTEM

(71) Applicant: HYOSUNG HEAVY INDUSTRIES CORPORATION, Seoul (KR)

(72) Inventor: Sung Min Oh, Seoul (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 0 days.

(21) Appl. No.: 16/067,516

(22) PCT Filed: Jun. 22, 2016

(86) PCT No.: PCT/KR2016/006635
§ 371 (c)(1),
(2) Date: Jun. 29, 2018

(87) PCT Pub. No.: WO2017/115950
PCT Pub. Date: Jul. 6, 2017

(65) Prior Publication Data
US 2019/0312433 A1      Oct. 10, 2019

(30) Foreign Application Priority Data
Dec. 30, 2015  (KR) .................. 10-2015-0190328

(51) Int. Cl.
*H02J 3/36*     (2006.01)
*H02M 1/00*   (2006.01)
*H02M 5/40*   (2006.01)

(52) U.S. Cl.
CPC .............. *H02J 3/36* (2013.01); *H02M 1/00* (2013.01); *H02M 5/40* (2013.01); *H02M 2001/0012* (2013.01); *H02M 2001/0025* (2013.01)

(58) Field of Classification Search
CPC .............. H02M 2001/0012; H02M 2001/0025
(Continued)

(56) References Cited

U.S. PATENT DOCUMENTS

2009/0102446 A1* 4/2009 Takahashi ............. H02M 3/157
                                                           323/283
2013/0301313 A1* 11/2013 Jiang-Hafner ........... H02J 3/36
                                                            363/35
(Continued)

FOREIGN PATENT DOCUMENTS

JP         05-265503 A    10/1993
JP      2010-033120 A      2/2010
(Continued)

OTHER PUBLICATIONS

The Study on the redundancy of HVDC Control and Protection System, Power Electronics Annual Conference.
(Continued)

*Primary Examiner* — Gary A Nash
(74) *Attorney, Agent, or Firm* — Novick, Kim & Lee, PLLC; Jae Youn Kim (57) ABSTRACT

Provided is a dual control apparatus and control method for a high voltage direct current (HVDC) system. The dual control apparatus comprises: a first controller and a second controller operated in a dual manner, the first controller and the second controller each including: a deviation calculation unit calculating a deviation between a target value and a control value; a PI controller performing proportional control and integral control on the deviation; a first buffer storing an error value for the integral control performed by the PI controller of a relevant one of the first and second controllers; and a second buffer storing an error value for the integral control performed by the PI controller of a remaining one of the first and second controllers.

9 Claims, 3 Drawing Sheets

(58) Field of Classification Search
USPC .................. 323/283–285, 322, 350; 363/35
See application file for complete search history.

(56) References Cited

U.S. PATENT DOCUMENTS

| | | | | |
|---|---|---|---|---|
| 2014/0002036 A1* | 1/2014 | Shimizu | ............... | H02M 3/04 |
| | | | | 323/234 |
| 2014/0266121 A1* | 9/2014 | Wee | ................ | H02M 3/1588 |
| | | | | 323/283 |

FOREIGN PATENT DOCUMENTS

| | | | |
|---|---|---|---|
| KR | 10-2003-0063847 A | | 7/2003 |
| KR | 10-2011-0115797 A | | 10/2011 |
| KR | 10-2015-0078489 A | | 7/2015 |

OTHER PUBLICATIONS

Jun-Mo Moon et al., The Study on the redundancy of HVDC Control and Protection System, DBPia, Nov. 2014, p. 175-176, Power Electronics Annual Conference.

\* cited by examiner

DUAL CONTROL APPARATUS AND CONTROL METHOD FOR HVDC SYSTEM

TECHNICAL FIELD

The present invention relates to a dual control apparatus and control method for a high voltage direct current (HVDC) system. More particularly, the present invention relates to a dual control apparatus and control method for an HVDC system, the apparatus and method preventing an occurrence of an error between control values of two controllers by sharing error values of integral controllers in the dual control apparatus for the HVDC system.

BACKGROUND ART

A high voltage direct current (HVDC) system operates in such a manner that AC power generated by a power station is converted into DC power for power transmission and DC power is reconverted into AC power at a power receiving point for power supply. The HVDC system operates in a power transmission method capable of efficient and economical power transmission through voltage boosting, which is an advantage of an AC power transmission method, and capable of overcoming various disadvantages of AC power transmission. Recently, the HVDC system has applied to submarine cable power transmission, large-capacity long-distance power transmission, connection between AC systems, etc.

The HVDC system is controlled by various types of control devices. In particular, recently, a control device outputting control signals using a proportional-integral (PI) control method has been introduced. In the control device using the proportional-integral control method, the residual deviation between a target value and a controlled variable generated in a proportional controller is eliminated by an integral controller through a combination of a proportional controller (P) and an integral controller (I), thereby outputting a sophisticated control signal.

In the meantime, stable operation of the HVDC system is extremely important, and thus it is essential that related equipment, such as the control device for the HVDC system, etc. is operated by being configured in a dual manner. Generally, the most common dual controller used in the HVDC system operates in an active/stand-by manner. When an active controller in the middle of operation is abnormal, switching to a stand-by controller in a standby state is performed for operation. In this case, it takes a particular time for switching of the controller.

In order to solve the problem, a recent dual controller for the HVDC system operates in an active/active manner. In the active/active manner, two controllers in a dual manner operate simultaneously, and perform the same operation simultaneously in such a manner that while the HVDC system is controlled by a first controller, a second controller may operate any time by switching thereto.

However, in the dual controller for the HVDC system using the proportional-integral control method, the following problem occurs. When the HVDC system is operated by a control signal according to proportional-integral calculation of the first controller, the second controller performs the same proportional-integral calculation and outputs a control signal. Here, even though the same target value is simultaneously input to the first controller and the second controller, a phenomenon that error integral values of the integral controller are excessively accumulated occurs in actual operation due to various environmental and electrical factors, resulting in the divergence of the control value. In this state, when switching of the controller is performed, the HVDC system malfunctions due to the divergence of the control value.

DISCLOSURE

Technical Problem

Accordingly, the present invention has been made keeping in mind the above problems occurring in the related art, and an object of the present invention is to provide a dual control apparatus and control method for an HVDC system, the apparatus and method preventing an occurrence of an error between control signals by sharing integral values of integral controllers in the dual control apparatus for the HVDC system in a proportional-integral (PI) control type.

Technical Solution

According to an embodiment of the present invention, there is provided a dual control apparatus for a HVDC system, the apparatus including: a first controller and a second controller operated in a dual manner, the first controller and the second controller each including: a deviation calculation unit calculating a deviation between a target value and a control value; a PI controller performing proportional control and integral control on the deviation; a first buffer storing an error value for the integral control performed by the PI controller of a relevant one of the first and second controllers; and a second buffer storing an error value for the integral control performed by the PI controller of a remaining one of the first and second controllers, wherein the PI controller of the first controller performs, using the error value stored in the first buffer of the first controller, the proportional control and the integral control on the deviation, and the PI controller of the second controller performs, using the error value stored in the second buffer of the second controller, the proportional control and the integral control on the deviation.

In the present invention, each of the first controller and the second controller may store the error value for the integral control performed by the PI controller of the relevant one of the first and second controllers in the first buffer of the relevant one, and may provide the error value to the remaining one of the first and second controllers, and the remaining one may store the received error value in the second buffer thereof.

In the present invention, when switching from the first controller to the second controller is performed, the PI controller of the second controller may perform, using the error value stored in the first buffer of the second controller, the proportional control and the integral control on the deviation, and the PI controller of the first controller may perform, using the error value stored in the second buffer of the first controller, the proportional control and the integral control on the deviation.

In the present invention, the dual control apparatus may further include: a switching unit performing switching to select one of an output value of the PI controller of the first controller and an output value of the PI controller of the second controller, wherein one of the output values of the PI controllers of the first controller and the second controller may be provided to the HVDC system according to the switching of the switching unit.

Also, according to an embodiment of the present invention, there is provided a dual control method for an HVDC system, the method including: a step a) of calculating, by a deviation calculation unit of a first controller, a deviation between a target value and a control value; a step b) of performing, by a PI controller of the first controller, first proportional control and first integral control on the deviation; a step c) of storing, by the first controller, an error value for the first integral control performed by the PI controller in a first buffer of the first controller; a step d) of providing, by the first controller, the error value to a second controller; a step e) of storing, by the second controller, the received error value in a second buffer of the second controller; a step f) of performing, by the PI controller of the first controller, second proportional control and second integral control on the deviation using the error value stored in the first buffer of the first controller; and a step g) of performing, by a PI controller of the second controller, third proportional control and third integral control on the deviation using the error value stored in the second buffer of the second controller.

In the present invention, the dual control method may further include: after the step g), a step g1) of storing, by the second controller, an error value for the third integral control performed by the PI controller of the second controller in a first buffer of the second controller; a step g2) of providing, by the second controller, the error value stored in the first buffer of the second controller to the first controller; and a step g3) of storing, by the first controller, the received error value in a second buffer of the first controller.

In the present invention, the dual control method may further include: after the step g3), when switching from the first controller to the second controller is performed, a step g4) of performing, by the PI controller of the second controller, fourth proportional control and fourth integral control on the deviation using the error value stored in the first buffer of the second controller; and a step g5) of performing, by the PI controller of the first controller, fifth proportional control and fifth integral control on the deviation using the error value stored in the second buffer of the first controller.

In the present invention, the dual control method may further include: after the step g4), storing, by the PI controller of the second controller, an error value for the fourth integral control in the first buffer of the second controller.

In the present invention, the dual control method may further include: after the step g5), storing, by the PI controller of the first controller, an error value for the fifth integral control in the first buffer of the first controller; and providing the error value stored in the first buffer of the first controller to the second controller.

Advantageous Effects

According to the present invention, the dual control apparatus for the HVDC system in a proportional-integral (PI) control type uses an error value of an integral controller of one controller as an error value of an integral controller of the other controller such that the deviation between error values for integral control of the two controllers may be eliminated.

Also, according to the present invention, the two controllers operate in an active/active manner, and thus even though switching between the two controllers is performed at an arbitrary time, there is no error between control values of the two controllers, such that malfunction of the HVDC system may be prevented.

Also, according to the present invention, synchronization between the two controllers according to proportional-integral control is unnecessary, and thus a separate operation or a separate device for applying a clock signal for synchronization is unnecessary.

MODE FOR INVENTION

Hereinafter, embodiments of the present invention will be described in detail with reference to the illustrative drawings. It is noted that in assigning reference numerals to elements in the drawings, the same reference numerals designate the same elements throughout the drawings although the elements are shown in different drawings. Also, in describing embodiments of the present invention, the detailed descriptions of known related constitutions or functions thereof may be omitted if they make the gist of the present invention unclear.

Further, when describing the elements of the present invention, terms such as first, second, A, B, (a), (b), etc. may be used. Since these terms are provided merely for the purpose of distinguishing the elements from each other, they do not limit the nature, sequence or order of the elements. When an element is "coupled to", "combined with", or "connected to" another element, it can be directly coupled to the other element or intervening elements may be present therebetween.

Figure 1:
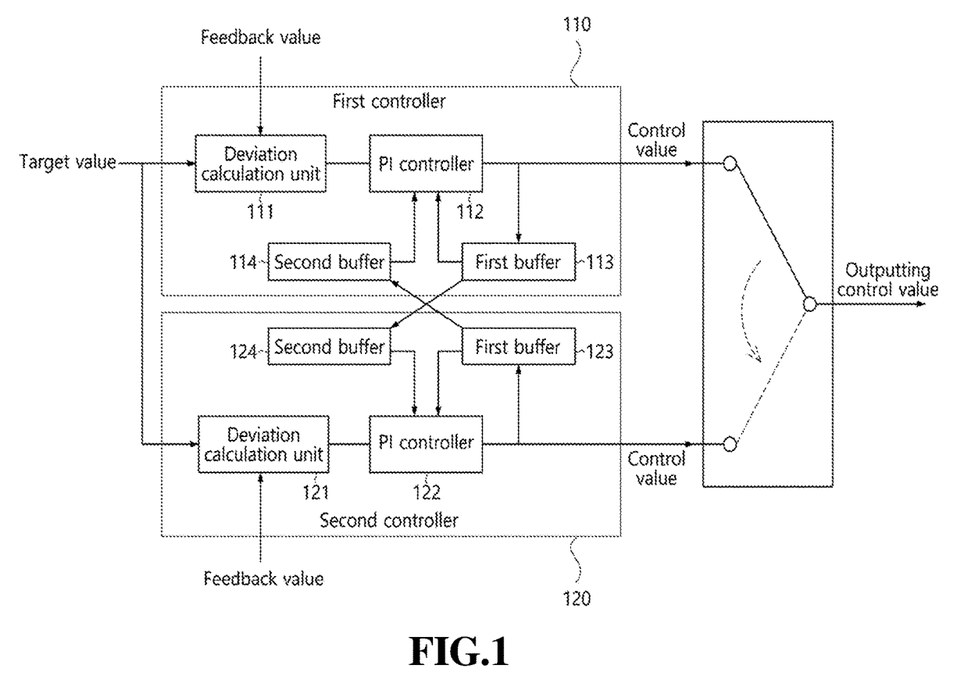
FIG. 1 is a diagram illustrating a configuration of a dual control apparatus for a HVDC system according to an embodiment of the present invention.

FIG. 1 is a diagram illustrating a configuration of a dual control apparatus for a HVDC system according to an embodiment of the present invention.

As shown in FIG. 1, according to the embodiment of the present invention, a dual control apparatus 100 for an HVDC system includes a first controller 110 and a second controller 120 that are operated in a dual manner, and a switching unit 130 at the rear end thereof. The first controller 110 and the second controller 120 include the same elements for dual operation. That is, the first controller 110 includes a deviation calculation unit 111, a PI controller 112, a first buffer 113, and a second buffer 114. Also, the second controller 120 includes a deviation calculation unit 121, a PI controller 122, a first buffer 123, and a second buffer 124. Also, according to the present invention, the dual control apparatus 100 for the HVDC system may include the switching unit 130 that selects one of output values of the first controller 110 and the second controller 120 and outputs the result to the rear end.

Each of the deviation calculation units 111 and 121 calculates the deviation between a preset target value and a feedback value received from a system. The target value is a control target value in the dual control apparatus 100 with respect to a control target of the system, and the feedback value is a result value received from the control target of the system. The target value and the feedback value are input to each of the deviation calculation units 111 and 121 according to a preset cycle. Each of the controllers 110 and 120 outputs a new control value through a particular calculation process using the deviation between the two values (the target value and the feedback value) input every cycle. To this end, the deviation calculation units 111 and 121 calculate the deviations, each with respect to the two values input every cycle, and provide the deviations to the PI controllers 112 and 122, respectively.

The PI controllers 112 and 122 perform proportional control and integral control on the deviations. To this end, each of the PI controllers 112 and 122 includes a proportional controller (not shown) and an integral controller (not shown). The proportional controller calculates a control value proportional to the deviation between the target value and the feedback value. The integral controller is used to eliminate an error value (residual error) that occurs due to inconsistency with the target value in spite of proportional control performed by the proportional controller. The error value is accumulated over time and the manipulated variable is increased at a particular level, whereby the error value is eliminated. As described above, proportional control and integral control are sequentially performed, and the results of two control values are added to output a final control value. Such a PI controller is a known technology, and thus the detailed description thereof will be omitted.

Each of the first buffers 113 and 123 stores the error value for integral control by its PI controller, and each of the second buffers 114 and 124 stores the error value for integral control by the PI controller of the counterpart controller. This process will be described in detail by separating the first controller 110 and the second controller 120. First, the first buffer 113 of the first controller 110 stores the error value for integral control among proportional control and integral control performed by the PI controller 112 of the first controller 110, and the first buffer 123 of the second controller 120 stores the error value for integral control among proportional control and integral control performed by the PI controller 122 of the second controller 120. Also, the second buffer 114 of the first controller 110 stores the error value for integral control among proportional control and integral control performed by the PI controller 122 of the counterpart controller, namely, the second controller 120, and the second buffer 124 of the second controller 120 stores the error value for integral control among proportional control and integral control performed by the PI controller 112 of the counterpart controller, namely, the first controller 110.

As described above, each of the first buffers 113 and 123 stores the error value for integral control performed by its PI controller, and each of the second buffers 114 and 124 stores the error value for integral control performed by the PI controller of the counterpart controller. The first controller 110 and the second controller 120 store respective error values for integral control according to their PI control as well as error values for integral control according to PI control of the counterpart controllers, whereby two controllers 110 and 120 share error values for integral control. Accordingly, the PI controller 112 of the first controller 110 performs proportional control and integral control on the relevant deviation using the error value stored in the first buffer 113 of the first controller 110, and the PI controller 122 of the second controller 120 performs proportional control and integral control on the relevant deviation using the error value stored in the second buffer 124 of the second controller 120.

For example, assuming that the first controller 110 operates as a master controller and the second controller 120 operates as a slave controller and the HVDC system is controlled by the first controller 110, the first controller 110 which is the master controller performs PI control on the deviation between the target value and the feedback value, and stores the error value for integral control in the first buffer 113. Next, the first controller 110 provides the error value to the second controller 120 for sharing with the second controller 120 which is the slave controller. Then, the second controller 120 receives and stores the error value in the second buffer 124. Accordingly, the PI controller 112 of the first controller 110 performs, using the error value stored in the first buffer 113 of the first controller 110, proportional control and integral control on the deviation between the target value and the feedback value that are input in the subsequent cycle, thereby updating and storing the error value for integral control in the first buffer 113 of the first controller 110. Also, in order to output the same control value as the first controller 110, the PI controller 122 of the second controller 120 performs, using the error value stored in the second buffer 124 of the second controller 120 which is the same as the error value stored in the first buffer 113 of the first controller 110, proportional control and integral control on the deviation between the feedback value and the target value that are input in the subsequent cycle. Here, the second controller 120 stores the error value for such integral control in the first buffer 123 of the second controller 120.

When the first controller 110 which is the master controller operates abnormally and switching to the second controller 120 which is the slave controller is required, the second controller 120 becomes a master controller and the PI controller 122 of the second controller 120 performs, using the error value stored in the first buffer 123 of the second controller 120 as described above, proportional control and integral control on the deviation between the feedback value and the target value that are input in the subsequent cycle. Further, the error value for integral control is stored in the first buffer 123 of the second controller 120, and the error value is provided to the first controller 110. Here, the first controller 110 stores the received error value in the second buffer 114 of the first controller 110, and the PI controller 112 of the first controller 110 performs, using the error value stored in the second buffer 114 of the first controller 110, proportional control and integral control on the deviation between the feedback value and the target value that are input in the subsequent cycle. Further, the error value for integral control is updated and stored in the first buffer 123 of the second controller 120.

As described above, the first controller 110 stores the error value for integral control performed by its PI controller 112 in its first buffer 113, and stores the error value for integral control performed by the PI controller 122 of the counterpart second controller 120, in its second buffer 114. In contrast, the second controller 120 stores the error value for integral control performed by its PI controller 122 in its first buffer 123, and stores the error value for integral control performed by the PI controller 112 of the counterpart first controller 110, in its second buffer 124. Accordingly, the first controller 110 and the second controller 120 share the error values, and perform proportional control and integral control on the deviation between the feedback value and the target value, by appropriately using the error values stored in the first buffers 113 and 123 or in the second buffers 114 and 124 of respective PI controllers 112 and 122 depending on whether being a master controller or a slave controller.

The switching unit 130 receives selectively one of the control values output from the first controller 110 and the second controller 120, and outputs the control value to the rear end. It is preferred that the switching unit 130 performs switching to select and receive the output value from the controller operating as a master controller.

Figure 2A:
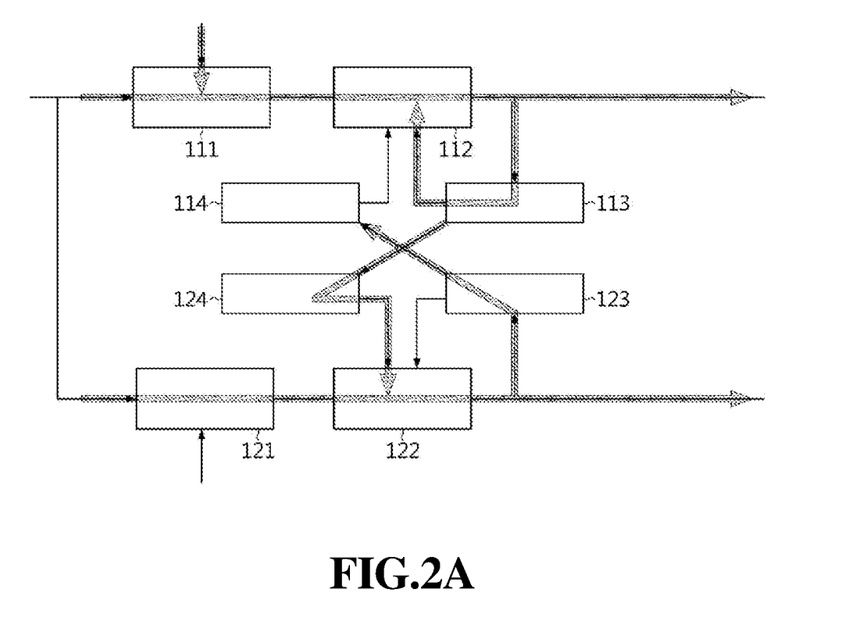
FIGS. 2A and 2B are diagrams illustrating a process of outputting a control signal of a dual control apparatus for a HVDC system according to the present invention.
Figure 2B:
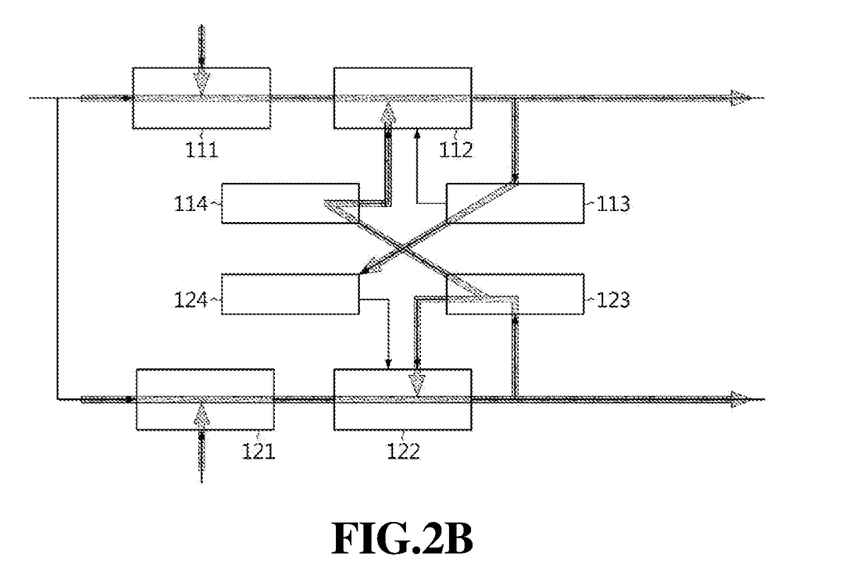

FIGS. 2A and 2B are diagrams illustrating operation of a dual control apparatus for a HVDC system according to the present invention.

FIG. 2A shows an example where the first controller 110 operates as a master controller and the second controller 120 operates as a slave controller, and FIG. 2B shows an example where switching to the second controller 120 from the first controller 110 is executed such that the second controller 120 operates as a master controller. Here, the master controller and the slave controller operate in an active/active manner, and thus the two controllers 110 and 120 perform the same operation. However, for this, synchronization between the two controllers 110 and 120 is unnecessary. PI control is performed using required data every preset cycle, and then the corresponding control value is output. The switching unit 130 at the rear end performs switching to be connected to a controller that operates as a master controller among the first controller 110 and the second controller 120, and receives the control value from the master controller to output the control value to the rear end.

Referring to FIG. 2A, the first controller 110 operating as the master controller performs PI control on the deviation between the feedback value and the target value that are input according to a preset cycle, and outputs the control value. Here, the error value for integral control among PI control is stored in the first buffer 113, and is provided to the second controller 120 in such a manner that the same error value is stored in the second buffer 124 of the second controller 120.

Accordingly, the first controller 110 which is the master controller performs, using the error value stored in its first buffer 113, PI control on the deviation between the target value and the feedback value that are input in the subsequent cycle, and the second controller 120 which is the slave controller performs, using the error value stored in its second buffer 124, PI control on the deviation between the target value and the feedback value that are input in the subsequent cycle. In this case, since the first controller 110 which is the master controller and the second controller 120 which is the slave controller perform PI control using the same error value, an error between the control values of the two controllers 110 and 120 may be eliminated. This operation is repeated every cycle while the first controller 110 operates as the master controller. Accordingly, since the first controller 110 is the master controller, the switching unit 130 at the rear end performs switching to select the control value output from the first controller 110.

Here, the second controller 120 stores the error value for integral control among its PI control in its first buffer 123, and provides the error value to the first controller 110 in such a manner that the same error value is stored in the second buffer 114 of the first controller 110. Accordingly, the first buffer 113 of the first controller 110 stores the error value for integral control performed by the first controller 110, and the second buffer 114 stores the error value for integral control performed by the second controller 120. In contrast, the first buffer 123 of the second controller 120 stores the error value for integral control performed by the second controller 120, and the second buffer 124 stores the error value for integral control performed by the first controller 110.

Referring to FIG. 2B, when abnormality occurs in the first controller 110 which is the master controller and switching to the second controller 120 is performed, the second controller 120 becomes a master controller and operates in an inverse manner to FIG. 2A. That is, the second controller 120 performs PI control on the deviation between the target value and the feedback value that are input every cycle to output the control value, and stores the error value for integral control among PI control in its first buffer 123. Then, the error value is provided to the first controller 110 such that the same error value is stored in the second buffer 114 of the first controller 110.

Accordingly, the second controller 120 which is the master controller performs, using the error value stored in its first buffer 123, PI control on the deviation between the target value and the feedback value that are input in the subsequent cycle, and the first controller 110 which is the slave controller performs, using the error value stored in its second buffer 114, PI control on the deviation between the target value and the feedback value that are input in the subsequent cycle. Also, in this case, since the second controller 120 which is the master controller and the first controller 110 which is the slave controller perform PI control using the same error value, an error between the control values of the two controllers 110 and 120 may be eliminated.

Here, the first controller 110 also stores the error value for integral control among its PI control in its first buffer 113, and provides the error value to the second controller 120 in such a manner that the same error value is stored in the second buffer 124 of the second controller 120.

Figure 3:
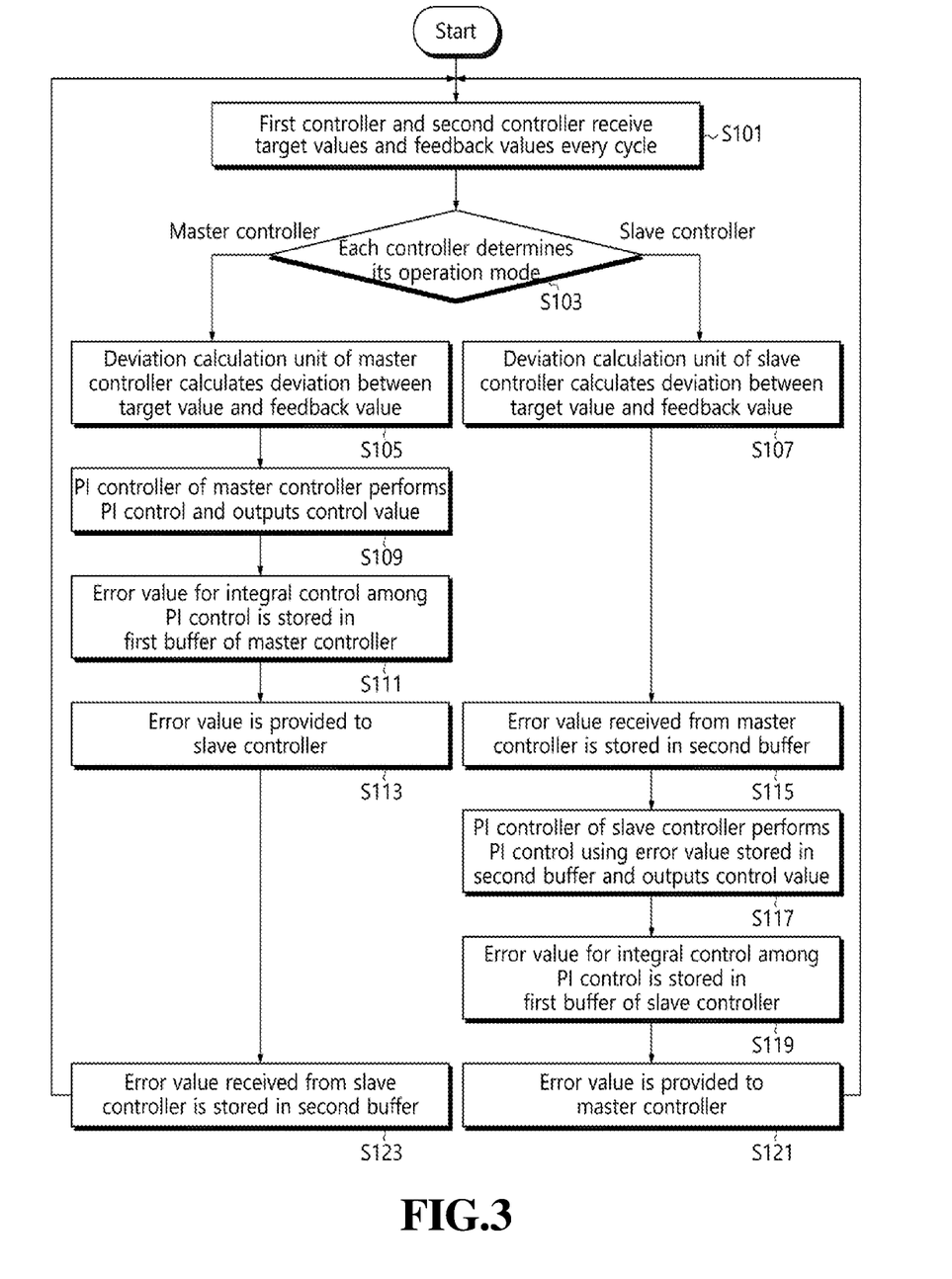
FIG. 3 is a flowchart illustrating a dual control method for a HVDC system according to an embodiment of the present invention.

FIG. 3 is a flowchart illustrating a dual control method for a HVDC system according to an embodiment of the present invention.

Referring to FIG. 3, the dual control method for the HVDC system according to the present invention is performed at the first controller 110 and the second controller 120 operated in a dual manner. To this end, the first controller 110 and the second controller 120 receive target values and feedback values every cycle at step S101, and determine its operation mode at step S103. The determination of the operation mode is intended to determine which controller among the first controller 110 and the second controller 120 is a master controller or a slave controller.

Next, the deviation calculation units of the master controller and the slave controller calculate respective deviations between target values and feedback values that are input every cycle at steps S105 and S107. The master controller performs PI control by the PI controller, and outputs the control value at step S109. After the error value for integral control among PI control is stored in the first buffer of the master controller at step S111, the error value is provided to the slave controller at step S113. Next, the slave controller stores the error value received from the master controller in its second buffer at step S115.

The slave controller performs, using the error value received from the master controller and stored in its second buffer as described above, PI control by its PI controller on the deviation between the target value and the feedback value that are received, and outputs the control value at step S117. After the error value for integral control among PI control is stored in its first buffer at step S119, the error value is provided to the master controller at step S121. Next, the master controller stores the error value received from the slave controller in its second buffer at step S123.

Thereafter, when operating as the master controller, the master controller repeats the above process while performing PI control every cycle using the error value stored in its first buffer. When operating as the slave controller, the slave controller repeats the above process. Even when switching between the master controller and the slave controller is performed at an arbitrary time, the master controller and the slave controller repeat their above-described processes.

As described above, in the dual control apparatus 100 for the HVDC system according to the embodiment of the present invention, two controllers 110 and 120 perform PI control and output control values. Here, two controllers 110 and 120 perform PI control using the same error value for integral control, and thus there is no error between control values calculated by the two controllers 110 and 120. Accordingly, even though switching between two controllers 110 and 120 is performed at an arbitrary time, there is no problem in operation of the HVDC system. The switching unit 130 at the rear end performs switching to select the control value output from the master controller, and provide the control value to the HVDC system.

In the above description, although a description has been made such that all components constituting embodiments of the present invention are combined into a single component or are operated with the components being combined with each other, the present invention is not limited to those embodiments. That is, within the scope of the present invention, one or more of all components may be selectively combined and operated. Further, it should be understood that terms such as "comprise", "include", or "have" are merely intended to indicate that the corresponding component is internally present, unless a description to the contrary is specifically pointed out in context, and are not intended to exclude the possibility that other components may be additionally included. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present invention.

The above description is merely intended to exemplarily describe the technical spirit of the present invention, and those skilled in the art will appreciate that various changes and modifications are possible without departing from the essential features of the present invention. Therefore, the embodiments disclosed in the present invention are not intended to restrict the technical spirit of the present invention and are merely intended to describe the present invention, and the scope of the present invention is not limited by those embodiments. The protection scope of the present invention should be defined by the accompanying claims, and the technical spirit of all equivalents thereof should be construed as being included in the scope of the present invention.

The invention claimed is:

1. A dual control apparatus for a HVDC system, the apparatus comprising:
a first controller and a second controller operated in a dual manner, the first controller and the second controller each including:
a deviation calculation unit calculating a deviation between a target value and a control value;
a PI controller performing proportional control and integral control on the deviation;
a first buffer storing an error value for the integral control performed by the PI controller of a relevant one of the first and second controllers; and
a second buffer storing an error value for the integral control performed by the PI controller of a remaining one of the first and second controllers,
wherein the PI controller of the first controller performs, using the error value stored in the first buffer of the first controller, the proportional control and the integral control on the deviation, and the PI controller of the second controller performs, using the error value stored in the second buffer of the second controller, the proportional control and the integral control on the deviation.

2. The dual control apparatus of claim 1, wherein each of the first controller and the second controller stores the error value for the integral control performed by the PI controller of the relevant one of the first and second controllers in the first buffer of the relevant one, and provides the error value to the remaining one of the first and second controllers, and the remaining one stores the received error value in the second buffer thereof.

3. The dual control apparatus of claim 2, wherein when switching from the first controller to the second controller is performed, the PI controller of the second controller performs, using the error value stored in the first buffer of the second controller, the proportional control and the integral control on the deviation, and the PI controller of the first controller performs, using the error value stored in the second buffer of the first controller, the proportional control and the integral control on the deviation.

4. The dual control apparatus of claim 1, further comprising:
a switching unit performing switching to select one of an output value of the PI controller of the first controller and an output value of the PI controller of the second controller,
wherein one of the output values of the PI controllers of the first controller and the second controller is provided to the HVDC system according to the switching of the switching unit.

5. A dual control method for a HVDC system, the method comprising:
a step a) of calculating, by a deviation calculation unit of a first controller, a deviation between a target value and a control value;
a step b) of performing, by a PI controller of the first controller, first proportional control and first integral control on the deviation;
a step c) of storing, by the first controller, an error value for the first integral control performed by the PI controller in a first buffer of the first controller;
a step d) of providing, by the first controller, the error value to a second controller;
a step e) of storing, by the second controller, the received error value in a second buffer of the second controller;
a step f) of performing, by the PI controller of the first controller, second proportional control and second integral control on the deviation using the error value stored in the first buffer of the first controller; and
a step g) of performing, by a PI controller of the second controller, third proportional control and third integral control on the deviation using the error value stored in the second buffer of the second controller.

6. The dual control method of claim 5, further comprising: after the step g),
a step g1) of storing, by the second controller, an error value for the third integral control performed by the PI controller of the second controller in a first buffer of the second controller;
a step g2) of providing, by the second controller, the error value stored in the first buffer of the second controller to the first controller; and
a step g3) of storing, by the first controller, the received error value in a second buffer of the first controller.

7. The dual control method of claim 6, further comprising:
after the step g3), when switching from the first controller to the second controller is performed,
- a step g4) of performing, by the PI controller of the second controller, fourth proportional control and fourth integral control on the deviation using the error value stored in the first buffer of the second controller; and
- a step g5) of performing, by the PI controller of the first controller, fifth proportional control and fifth integral control on the deviation using the error value stored in the second buffer of the first controller.

8. The dual control method of claim 7, further comprising:
after the step g4),
- storing, by the PI controller of the second controller, an error value for the fourth integral control in the first buffer of the second controller.

9. The dual control method of claim 7, further comprising:
after the step g5),
- storing, by the PI controller of the first controller, an error value for the fifth integral control in the first buffer of the first controller; and
- providing the error value stored in the first buffer of the first controller to the second controller.

\* \* \* \* \*